United States Patent
Auerbach (10) Patent No.: US 7,761,439 B1
(45) Date of Patent: Jul. 20, 2010

(54) SYSTEMS AND METHODS FOR PERFORMING A DIRECTORY SEARCH

(75) Inventor: David Benjamin Auerbach, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 602 days.

(21) Appl. No.: 10/882,057

(22) Filed: Jun. 30, 2004

(51) Int. Cl.
*G06F 17/30* (2006.01)

(52) U.S. Cl. ...................................... 707/706

(58) Field of Classification Search ........................ None
See application file for complete search history.

(56) References Cited

U.S. PATENT DOCUMENTS

| | | | |
|---|---|---|---|
| 5,615,367 A * | 3/1997 | Bennett et al. ............... | 707/102 |
| 5,696,486 A * | 12/1997 | Poliquin et al. ............. | 340/506 |
| 5,778,377 A * | 7/1998 | Marlin et al. ........... | 707/103 R |
| 5,826,261 A | 10/1998 | Spencer | |
| 5,850,511 A * | 12/1998 | Stoecker et al. ............... | 714/38 |
| 5,874,953 A * | 2/1999 | Webster et al. .............. | 715/733 |
| 6,006,222 A | 12/1999 | Culliss | |
| 6,014,665 A | 1/2000 | Culliss | |
| 6,052,687 A * | 4/2000 | Miura et al. ................. | 707/100 |
| 6,078,916 A | 6/2000 | Culliss | |
| 6,101,491 A | 8/2000 | Woods | |
| 6,128,635 A * | 10/2000 | Ikeno ......................... | 715/246 |
| 6,147,773 A * | 11/2000 | Taylor et al. ................. | 358/400 |
| 6,182,068 B1 | 1/2001 | Culliss | |
| 6,195,095 B1 * | 2/2001 | Beer et al. ................... | 715/839 |
| 6,311,178 B1 * | 10/2001 | Bi et al. .......................... | 707/3 |
| 6,345,266 B1 * | 2/2002 | Ganguly et al. ................. | 707/1 |
| 6,349,299 B1 * | 2/2002 | Spencer et al. ................. | 707/10 |
| 6,393,253 B1 * | 5/2002 | Kitabatake ................... | 434/350 |
| 6,393,464 B1 * | 5/2002 | Dieterman ................... | 709/206 |
| 6,477,543 B1 * | 11/2002 | Huang et al. ................. | 707/200 |
| 6,523,028 B1 * | 2/2003 | DiDomizio et al. ............ | 707/5 |
| 6,523,035 B1 * | 2/2003 | Fleming et al. ............... | 707/10 |
| 6,581,056 B1 | 6/2003 | Rao | |
| 6,601,061 B1 * | 7/2003 | Holt et al. ....................... | 707/3 |

(Continued)

FOREIGN PATENT DOCUMENTS

| WO | WO 98/12881 | 3/1998 |
|---|---|---|
| WO | WO 01/16807 | 3/2001 |
| WO | WO 03/036520 | 5/2003 |

OTHER PUBLICATIONS

"Outlook 2000 in a Nutshell" by Bo Leuf and Tom Syroid, sections 3.2, 3.6 and 6. Published by O'Reilly, Apr. 1, 2000.*

(Continued)

*Primary Examiner*—Neveen Abel Jalil
*Assistant Examiner*—Mark Andrew X Radtke
(74) *Attorney, Agent, or Firm*—Fenwick & West LLP (57) ABSTRACT

Systems and methods for performing a directory search are described. In one described system, a computer program receives a first search query and causes the first search query to be executed on a directory. The program generates a second search query associated with the first search query and causes the second search query to be executed on a local data store. The program then obtains a first result from the directory, obtains a second result from the local data store, and generates and outputs a result set, the result set comprising the first result and the second result.

28 Claims, 4 Drawing Sheets

U.S. PATENT DOCUMENTS

| | | | |
|---|---|---|---|
| 6,611,862 B2 | 8/2003 | Reisman | |
| 6,633,872 B2* | 10/2003 | Ambrosini et al. | 707/9 |
| 6,633,873 B1 | 10/2003 | Nakamura | |
| 6,651,054 B1 | 11/2003 | de Judicibus | |
| 6,772,194 B1* | 8/2004 | Goldschmidt | 709/203 |
| 6,795,820 B2 | 9/2004 | Barnett | |
| 6,895,426 B1* | 5/2005 | Cortright et al. | 709/206 |
| 6,901,410 B2* | 5/2005 | Marron et al. | 707/104.1 |
| 6,944,610 B2* | 9/2005 | Moore et al. | 707/3 |
| 6,970,906 B1* | 11/2005 | Parsons et al. | 709/204 |
| 6,976,053 B1 | 12/2005 | Tripp et al. | |
| 7,020,662 B2* | 3/2006 | Boreham et al. | 707/104.1 |
| 7,076,484 B2* | 7/2006 | Dworkis et al. | 707/5 |
| 7,243,355 B2* | 7/2007 | Espino | 719/328 |
| 7,346,559 B2* | 3/2008 | Kraft et al. | 705/27 |
| 7,457,862 B2* | 11/2008 | Hepworth et al. | 709/224 |
| 7,509,303 B1* | 3/2009 | Chen | 707/3 |
| 7,516,118 B1 | 4/2009 | Badros et al. | |
| 2002/0078004 A1* | 6/2002 | Ambrosini et al. | 707/1 |
| 2002/0143759 A1 | 10/2002 | Yu | |
| 2002/0147704 A1 | 10/2002 | Borchers | |
| 2003/0055831 A1 | 3/2003 | Ryan et al. | |
| 2003/0084032 A1 | 5/2003 | Grewal et al. | |
| 2003/0144924 A1 | 7/2003 | McGee | |
| 2003/0167266 A1 | 9/2003 | Saldanha et al. | |
| 2004/0049494 A1 | 3/2004 | Kottisa | |
| 2004/0103087 A1 | 5/2004 | Mukherjee et al. | |
| 2004/0139106 A1 | 7/2004 | Bachman et al. | |
| 2004/0143569 A1 | 7/2004 | Gross et al. | |
| 2004/0209597 A1* | 10/2004 | Myles et al. | 455/410 |
| 2004/0215607 A1 | 10/2004 | Travis | |
| 2005/0021506 A1 | 1/2005 | Sauermann et al. | |
| 2005/0033803 A1 | 2/2005 | Vleet et al. | |
| 2005/0131866 A1 | 6/2005 | Badros et al. | |
| 2005/0216485 A1* | 9/2005 | Bell et al. | 707/100 |

OTHER PUBLICATIONS

Graham, R.Y. Subject no-hits searches in an academic library online catalog: An exploration of two potential ameliorations. College & research libraries. (2004) vol. 65, No. 1, pp. 36-54.*
Leake et al. "Selecting Task-Relevant Sources for Just-in-Time Retrieval" (1999). Available online at http://citeseerx.ist.psu.edu/viewdoc/summary?doi=10.1.1.50.2080.*
U.S. Appl. No. 10/749,440, filed Dec. 31, 2003, Badros et al.
80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/wbipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," http://www7.scu.edu.au/programme/fullpapers/1921/com1921.htm, pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://www.devon-techonologies.com/products/devonthink.php, printed Mar. 16, 2004.
dtSearch®—http://www.dtsearch.com/, printed Mar. 15, 2004.
Dumais, S., et al, "Stuff I've Seen: A System for Personal Information Retrieval and Re-Use," Microsoft Research, *SIGIR'03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu printed Mar. 16, 2004.
Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www,isysusa.com/products/desktop/index.html, printed Mar. 16, 2004.
Joachims, T., et al.,"WebWatcher: A Tour Guide for the World Wide Web," 1996.
Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.
Naraine, R., "Future of Search Will Make You Dizzy," Enterprise, May 20, 2004, http://www.internetnews.com/ent-news/article.php/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.
"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.
"Selecting Task-Relevant Sources for Just-In-Time Retrieval," pp. 1-3, no date.
Sherman, C., "HotBot's New Desktop Search Toolbar," www.searchenginewatch.com, http://searchenginewatch.com/searchday/print.php/34711_339921, pp. 1-3. printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page, "Welcome to the WebWatcher Project," http://www-2.cs.cmu.edu/~webwatcher/, printed Oct. 15, 2003.
"WhenU Just-In-Time Marketing," http://www.whenu,com, printed Mar. 19, 2004.
X1 instantly searches files & email. For outlook, Outlook, http://www.x1.com/, printed Mar. 15, 2004.
Zellweger, P., et al., "Fluid Links for Informed and Incremental Link Transitions," Proceedings of Hypertext'98, Pittsburgh, PA, Jun. 20-24, 1998, pp. 50-57.
International Search Report and Written Opinion, PCT/US2004/039366, Feb. 28, 2005.

* cited by examiner

SYSTEMS AND METHODS FOR PERFORMING A DIRECTORY SEARCH

RELATED APPLICATION

This application relates to U.S. patent application Ser. No. 10/749,998, filed Dec. 31, 2003, titled "Systems and Methods for Unification of Search Results," the entirety of which is incorporated herein by reference.

FIELD OF THE INVENTION

The present invention relates generally to methods and systems for information retrieval. The present invention relates particularly to systems and methods for performing a directory search.

BACKGROUND

If a user wishes to locate or contact a person or organization, the user may utilize a variety of computer applications to do so. Directory or contact information may be stored in multiple locations and in many varying formats. For example, directory information may be stored in a global directory, such as a Lightweight Directory Access Protocol (LDAP) compliant directory on the Internet or on a local network. Directory information may also be stored in a local data store, such as a database or a contact list.

Directory information, particularly contact information, may be stored in other forms as well, including formatted and unformatted text. For example, many web sites include a "Contact Us" web page that often includes the street address, phone number, and email address of a person or organization.

A user wishing to find directory or contact information for a person, organization, or other entity may utilize a web-based directory search tool, such as the search tools available on Bigfoot Communication's web site (Bigfoot Communications Limited, www.bigfoot.com). If the user is looking for contact information for one of the user's contacts, the user may use the address book associated with the user's electronic messaging application. The user may also utilize a conventional search engine, such as the Google® search engine to locate directory or contact information.

SUMMARY

Embodiments of the present invention provide systems and methods for performing a directory search. In one embodiment of the present invention, a computer program, such as a query system, receives a first search query and causes the first search query to be executed on a directory. The query system also generates a second search query associated with the first search query and causes the second search query to be executed on a local data store. The query system obtains a first result from the directory and a second result from the local data store, and generates a result set. The result set comprises the first result and the second result. In another embodiment, a computer-readable medium (such as, for example random access memory or a computer disk) comprises code for carrying out such a method.

These illustrative embodiments are mentioned not to limit or define the invention, but to provide examples of embodiments of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for performing a directory search. Illustrative embodiments are described below.

System Architecture

Figure 1:
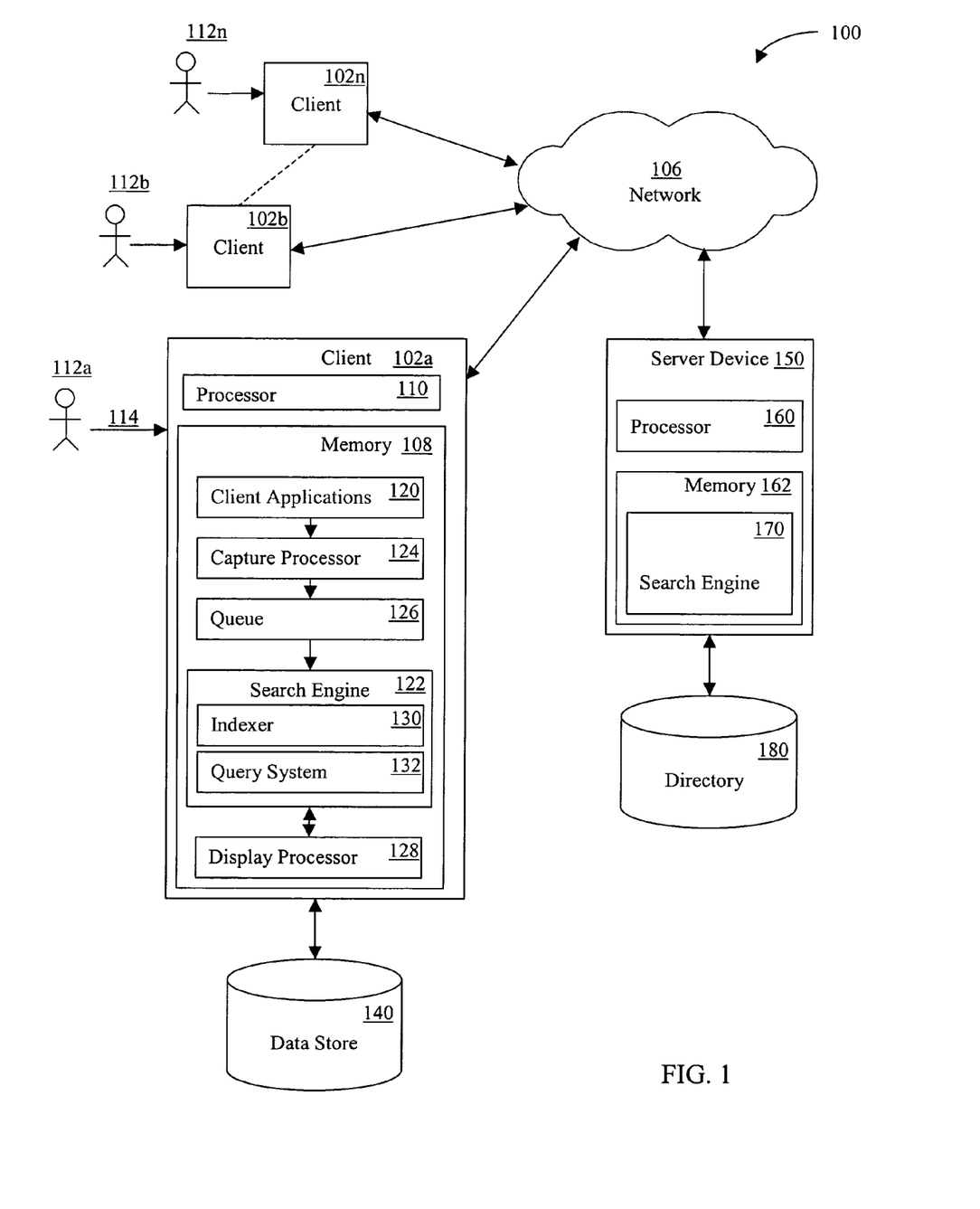
FIG. 1 is a block diagram illustrating an illustrative environment in which one embodiment of the present invention may operate.

Referring now to the drawings in which like numerals indicate like elements throughout the several figures, FIG. 1 is a block diagram illustrating an illustrative environment for implementation of an embodiment of the present invention. While the environment shown reflects a client-side search engine architecture embodiment, other embodiments are possible.

The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, and any other application or computer program capable of being executed by a client device.

The user 112a can interact with the various client applications 120 and articles associated with the client applications 120 via various input and output devices of the client device 102a. Articles include, for example, word processor, spreadsheet, presentation, e-mail, instant messenger, database, contacts, directory entries, and other client application program content files or groups of files, web pages of various formats, such as Hypertext Markup Language (HTML), eXtensible Markup Language (XML), eXtensible Hypertext Markup Language (XHTML), Portable Document Format (PDF) files, and audio files, video files, or any other documents or groups of documents or information of any type whatsoever.

The memory 108 of the client device 102a shown also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The search engine 122 shown contains an indexer 130, a query system 132, and a formatter 134. Events, real-time and historical, contextual and indexable, and performance data can be sent by the queue 126 to the query system 132 to provide the query system 132 with information concerning current user context. The query system 132 can use this information to generate an implicit query. The query system 132 can also receive and process explicit queries from the user 112a.

The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs.

The data store 140 comprises a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events or other means. Based on the query, the query system 132 can locate relevant information in the data store 140 or other index and provide a result set. In one embodiment, the result set comprises article identifiers identifying articles associated with the client applications 120 or client articles. Client articles stored in the data store 140 include articles associated with the user 112a or client device 102a, such as the word processing documents, previously viewed web pages and any other article associated with the client device 102a or user 112a. In another embodiment, the result set also comprises identifiers identifying articles located on the network 106 or network articles located by a search engine on a server device. Network articles include articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article.

Messaging articles stored in the data store 140 include user's emails, chat messages, and instant messaging messages. Each time a message is received, sent, modified, printed, or otherwise accessed, a record is stored in the data store 140. This information can later be searched to identify messages that should be displayed in the user interface.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting HTML pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of or combination of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a URL, a file name, a link, an icon, a path for a local file, or anything else that identifies an article. In the embodiment shown, an article identifier comprises a URL associated with an article. The result set may include text, audio, video or any other type of content.

In the embodiment shown in FIG. 1, the server device 150, or related device, has previously performed a crawl of the network 106 to locate articles, such as web pages, stored at other devices or systems connected to the network 106, and indexed the articles in memory 162 or on another data storage device. In other embodiments, a crawl is not performed. For example, in one embodiment, an index of articles is created manually.

Referring still to the embodiment shown in FIG. 1, the search engine 170 is in communication with a directory 180. The directory 180 comprises information about individuals or entities. For example, the directory 180 may comprise a list of names and addresses similar to that which is published in a white pages paper directory. In one embodiment, the directory 180 comprises information generally contained in a yellow pages directory.

The directory 180 may utilize any structure. In one embodiment, the directory comprises one or more tables in a relational database, such as an Oracle® relational database. In another embodiment, the directory comprises a directory utilizing directory service markup language (DSML) and/or one that is compliant with the Lightweight Directory Access Protocol (LDAP). The LDAP protocol allows email programs to access contact information from a server, either locally or on a global network, such as the Internet. Other directory structures may also be utilized.

It should be noted that embodiments of the present invention may comprise systems having different architecture than that which is shown in FIG. 1. For example, in some systems according to the present invention, server device 104 may comprise a single physical or logical server. The system 100 shown in FIG. 1 is merely illustrative, and is used to explain the illustrative methods shown in FIGS. 2 and 3.

Process

Various methods may be implemented in the environment shown in FIG. 1 and other environments, according to the present invention. Methods according to the present invention may be implemented by, for example, a processor-executable program code stored on a computer-readable medium.

In one embodiment of the present invention, a computer program, such as a query system 132, receives a first search query and causes the first search query to be executed on a directory having, for example contact information for individuals or businesses. The query system 132 also generates a second search query associated with the first search query. The query system 132 then causes the second search query to be executed on a local data store also having, for example, contact information for individuals and businesses. The generation of the second search query in one embodiment is accomplished by translating the first search query into a format that facilitates searching of the local data store. The query system 132 receives a first result from the directory, receives a second result from the local data store, and generates a result set, the result set comprising the first result and the second result. The query system 132 may cause the result set to be output to the user that submitted the search query.

The directory may utilize any suitable format and storage means. For example, in one embodiment, the directory comprises an LDAP compliant directory. The local data store also may utilize any suitable format and storage means. In one embodiment, the local data store comprises an address book. In another embodiment, the local data store comprises an index, such as an event or document index.

The results from the directory and from the local data store may be returned in various formats. For example, in one embodiment, the result is returned as a directory entry, such as one compliant with the LDAP. The results from the local data store may also be returned in various formats. For example, in one embodiment, the second result comprises a contact, such as a contact from a Microsoft® Outlook® contacts list.

The user may enter any acceptable type of information to find a person or entity. In one embodiment, the user enters a telephone number. In another embodiment, the user enters the name of an entity or person. The query received by the query system 132 may be explicit or implicit.

In one embodiment, the query system 132 receives a result set comprising one or more search results associated with a search query, the result set comprising a search result. The query system 132 also receives a directory entry. The query system 132 identifies a discrepancy between the two entries (e.g., the zip code differs). In response, the query system 132 outputs an alert associated with the discrepancy. The query system may modify the directory entry based at least in part on the discrepancy.

Embodiments of the present invention may utilize user preferences in formulating queries and/or outputting results. For example, in one embodiment, the query system 132 receives a user preference and modifies the result set based at least in part on the user preference. Modifying the result set may comprise, for example, filtering or reordering the result set. In another embodiment, the query system 132 receive a user preference and modifies the first and/or second search queries based at least in part on the user preference.

In embodiments of the present invention, the query system 132 may modify a search query, a result set, and/or both based on a directory entry. For instance, the query system 132 may modify the priority, significance, and/or placement of the search results in the result set. In one embodiment of the present invention, the query system 132 receives a search query 132. The query system 132 then determines a directory entry associated with the search query. For example, the query system may search the user's contacts for a directory entry that matches terms in the search query. The query system 132 modifies the search query based at least in part of attributes of the directory entry. For example, the query system 132 may add a term to or replace a term in the search query based on an attribute of the directory entry or replace a term in the search query. For instance, if a user performs a search for "John Smith," and the user's contact file includes an entry for "John Smith," the query system may add the city attribute of the directory entry as a term to the search query. The query system 132 causes the search query to be executed and, in response, receives a result set.

In one embodiment of the present invention, the query system 132 receives a result set associated with a search query. The result set comprises a plurality of results. The query system 132 searches a directory to determine a directory entry associated with at least one of the results. The query system 132 modifies the search result based at least in part on an attribute of the directory entry. The query system 132 may add the attribute to the result or replace a portion of the result with the directory entry attribute. For example, the user may have a contact that has recently moved. When the user executes a search query, a result that includes the contact's address is received. The result may include an incorrect address if it has not been recently updated. The query system 132 matches the result to the directory and can either display the address information from the user's contact file in conjunction with the information returned or can replace the information returned with the contact file information. The query system 132 may give more prominence to information that matches information in the directory, or reduce prominence of information not found in the directory.

In one embodiment of the present invention, the query system 132 modifies a directory entry based on results from a search. In one such embodiment, the query system receives a result set associated with a search query, determines a directory entry associated with one of the search results in the result set, and modifies an attribute of the directory entry based at least in part on the search result. In one embodiment, the query system 132 identifies a directory entry attribute to be modified (e.g., address, middle name, phone number) and requests a confirmation to modify the attribute based on discrepancies between search result data and directory data. If the confirmation is received, the query system 132 modifies the entry.

In another embodiment, the query system receives a result set associated with a search query and creates a directory entry based at least in part on the search result. For example, the user may enter a search query comprising the terms "john smith palo alto." The query system 132 identifies the pair of terms "john smith" as potentially being a name and "palo alto" as potentially being the name of a city. The first result returned in the result set is a white pages entry for John Smith in Palo Alto, Calif. The query system 132 extracts the information from the result and creates a directory entry for the user in the user's contact file.

Figure 2:
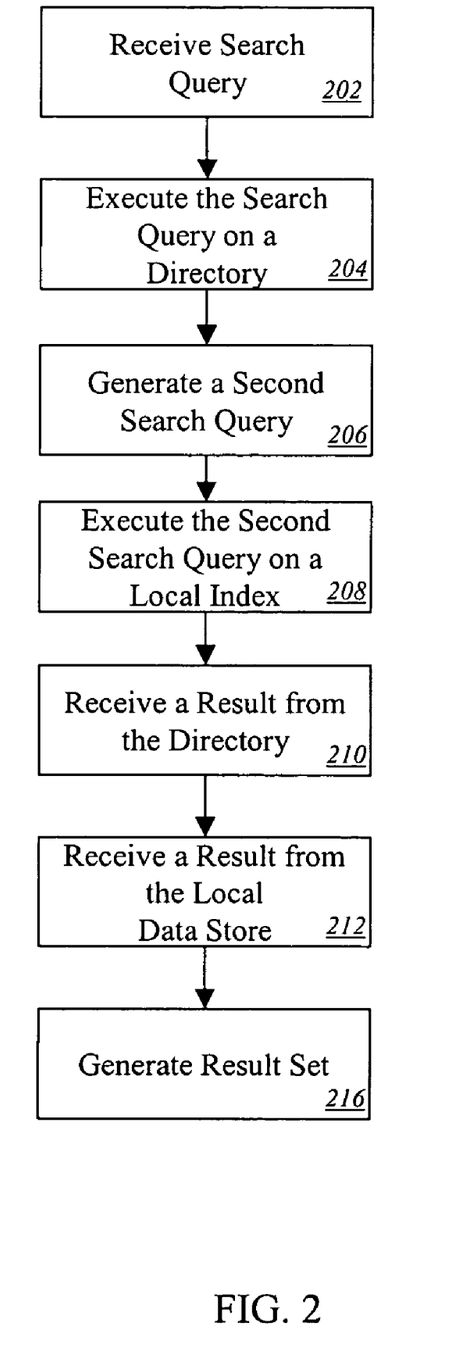
FIG. 2 is a flowchart illustrating a process for combining the results of a directory search with the results from a local data store in one embodiment of the present invention.

FIG. 2 is a flowchart illustrating a process for combining the results of a directory search with the results from a local data store in one embodiment of the present invention. In the embodiment shown, a computer, such as the query system 132, receives a search query from a user of the system 202. The search query shown in FIG. 2 is being performed to retrieve information regarding a person or entity. The search query may be, for example, part of a person's or company's name.

The search query is identified by the query system 132 as being a search query related to contact or directory information. Contact or directory information includes information, such as the name of a person or entity, the address, the city, the state, the phone number, the organization to which a person or entity belongs, and other information related to the person or entity. The user may explicitly identify a search query as being related to contact or directory information. For example, in one embodiment, the user selects an option on a user interface, the option specifying that the user is searching for a person. In another embodiment, the query system 132 identifies the query as a query related to contact or directory information. For example, the query system 132 may identify the terms of the search query as proper nouns, indicating that the user may be searching for contact or directory information.

The query system 132 causes the search query to be executed on a directory 204. In the embodiment shown in FIG. 1, the query system 132 may cause the search query to be submitted to the search engine 170, which executes the search on the directory 180. In another embodiment, the directory may be stored in data store 140 or in some other local memory.

In the embodiment shown in FIG. 2, the query system 132 generates a second query related to the first query 206. For example, the first query may be translated to a format suitable to query a specific type of directory, such as an LDAP-compliant directory. In doing so, the query system 132 uses the first query to generate a second query that can be executed on a local index. The query system 132 then causes the second query to be executed on a local index 208. For example, the query system 132 may cause the second query to be executed on an index in the local data store 140 that relates a set of indexed articles also stored in the local data store 140. The articles may include, for example, a resume of a person or a contact web page for an entity. In one embodiment, the local data store 140 resides on the computer of the user submitting the first query and comprises a user's list of contacts in an address book.

The query system 132 obtains a query result from the directory 210. If the directory includes one or more entries that match the first query (for example, that contains the query terms submitted), the result set includes data from those entries. If not, the result set may be empty or may include a single result indicating that no directory entries matched the query.

The query system 132 also obtains a result from the local data store 212. If the local data store includes one or more entries that match the second query, the result set includes those entries. If not, the result set may be empty or may include a single result indicating that no directory entries matched the query.

The query system 132 then combines the result sets from the directory and the local data store into a combined result set for display to the user 214. Combining the result sets may comprise displaying separate result sets in one interface or may comprise performing some other type of combining. For example, in one embodiment, the query system 132 compares the results from the directory with the results from the local data store to determine how to display the results. If duplicate results are found, e.g., if the name and address of a person or entity is found in both places, only one of the results is displayed to the user. In another embodiment, the query system 132 uses file date stamps or other data to determine a chronology of entries related to the person or entity. The query system 132 then creates a combined result set that lists a history of the directory entries for the person or entity.

The query system 132 then causes the combined result set to be displayed to the user. The result set may be displayed, for example, as an HTML page or as a small popup displayed on top of another application or in any other manner that provides the information to the user in a meaningful manner.

Figure 3:
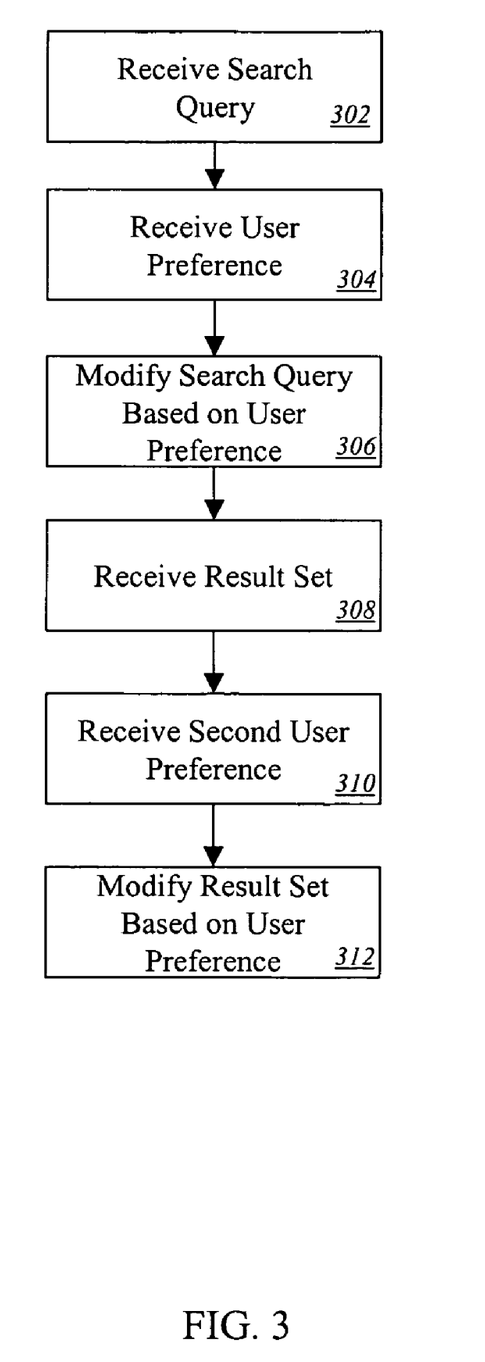
FIG. 3 is a flowchart illustrating a process for modifying the search and combined result set based on one or more user preferences in one embodiment of the present invention.

The search and combined result set may be modified based on user-specific and/or user-specified parameters. FIG. 3 is a flowchart illustrating a process for modifying the search and combined result set based on one or more user preferences. In the embodiment shown in FIG. 2, the query system 132 receives a search query 302 from a user of the system. The query system 132 also receives a user preference associated with the submitter of the search query, which is relevant, directly or indirectly, to the search query 304. For example, the user preference may include a parameter that specifies that search queries related to directory entries include a limitation to the user's home city and/or state. The query system 132 modifies the search query based on the user preference 306.

In one embodiment, the search query 132 is then executed against an LDAP-compliant directory on the Internet. The query system 132 adds a filter to the query that specifies that only those addresses in the user's home state be returned by the query.

The query system 132 receives the result set, e.g., the directory entries 308. The query system 132 then receives a second user preference related to the presentation of a result set 310. Although the receiving the second preference appears after receiving the result set in FIG. 3, an embodiment of the present invention may execute the process in alternate ways. For example, the query system 132 may receive all user preferences at once and apply the preferences as necessary during the remainder of the process. The query system 132 uses the user preference to modify the result set 312.

For example, in one embodiment, the user prefers that directory entries be sorted in ascending chronological order, i.e., the user wishes to see the oldest directory entries found first. The user stores this preference. The directory may return the results in any order, e.g., sorted in descending chronological order with the most recent entries listed first. In this case, the query system 132 notes this second user preference and modifies the result set by reversing the sort order.

Figure 4:
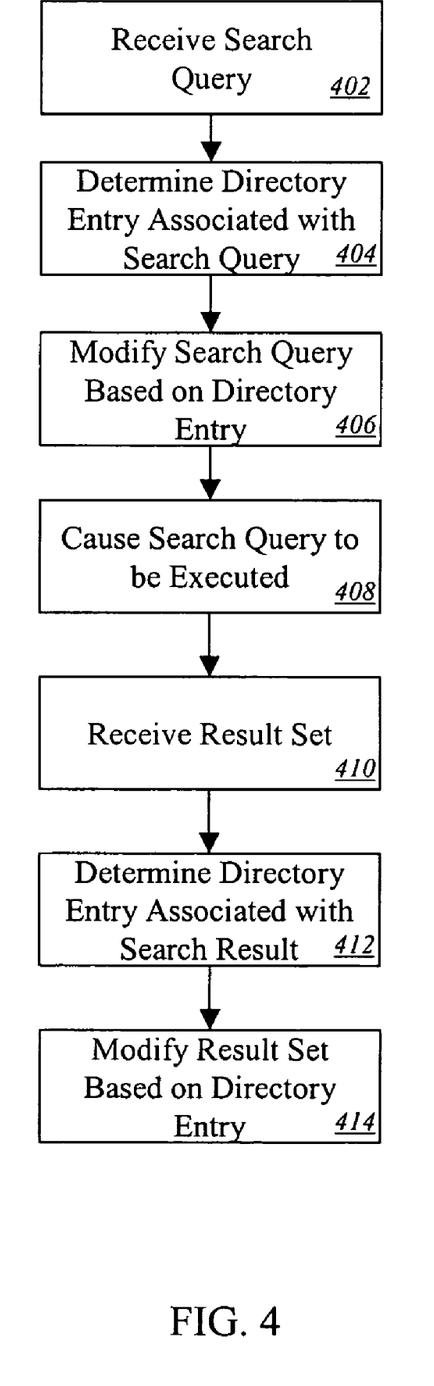
FIG. 4 is a flowchart illustrating a process for modifying a search query and a search result based at least in part on a directory entry.

FIG. 4 is a flowchart illustrating a process for modifying a search query and a search result based at least in part on a directory entry. The user enters a search query comprising search terms. The query system 132 receives the search query 132. The query system 132 then determines a directory entry associated with a search term 404. For example, the query system 132 may search an Exchange server's global address list for an entry corresponding to one or more search terms.

The query system 132 then uses the information from the directory entry to modify the search query 406. For example, if the query system 132 locates an entry in the global address book that corresponds to one or more search terms, the query system 132 may add the address from the directory entry as a term in the search query.

The query system 132 then causes the search query to be executed 408. In response the query system 132 receives a result set 410. In the embodiment shown, the query system 132 next determines a directory entry associated with one or more of the search results in the result set 412. For example, the query system 132 may determine that one or more results in the result set were retrieved from a white pages directory. The query system 132 may perform a search of the Exchange server's global address book for corresponding entries. If the query system 132 locates an entry corresponding to a search result, the query system 132 modifies the result based at least in part on the directory entry 414. For example, the query system 132 may add the global address book entry as text to the result and mark it as locally-available directory information or replace information in the result (e.g., the email address) with information from the global address book.

Example

In one embodiment of the present invention, a computer user wishes to find contact information for a person named "John Smith." The user may have sent emails to John Smith, read an article by John Smith, or performed some other activity that caused an entry in an index in a local data store. An entry for John Smith may also exist in the user's list of email contacts. The user may wish to search directory information for John Smith because the user's contact information is or may be out of date.

The user has previously stored preferences, including that the user prefers to perform directory searches limited to the local geographical area, the user wishes to see directory entries in chronological order, and that the user does not wish to see redundant directory entries. The user navigates to an HTML page, specifically designed for searching for people or entities, such as a white pages search page. The user enters the name "John Smith" in the search field and submits the search query.

The query system 132 receives the query. The query system 132 determines whether or not to apply a personal preference to the query. The user in the illustrative embodiment has specified a preference to search only for entries in California. Accordingly, the query system 132 modifies the search query to include a term or limitation for California and submits it to a directory. For example, the query system 132 may submit the query to an LDAP-compliant directory service on the Internet. The directory returns all entries that match the query, including the geographical limitation.

The directory may return zero, one, or many results. In the example of a query for "John Smith" in California, a public directly will likely return hundreds and possibly thousands or results. The results are sorted in some manner, such as by middle initial, city, zip code, or some other attribute. The query system 132 receives these results.

The query system 132 generates a second query that can be submitted to a local data store, such as a document or event index. The query is associated with the search query received by the query system 132. In other words, the query system 132 generates a query to be executed against a local index that is formulated to return results related to a person or entity named "John Smith." The query system 132 may also modify the second query based on the user preference. For example, the second query may be limited to California as the first query was. The local index returns zero, one, or more results related to "John Smith."

Each of the results from the directory, particularly if it is a global directory, is likely to vary in relevance to the user submitting the query. The results returned from the local index are also likely to vary in relevance. However, the results from the local index are more likely to be relevant in general than those in the directory since the local index stores information specific to the user.

The query system 132 combines the two results sets to create information to be displayed to the user. The query system 132 may use a user preference to determine how to display the results. For example, the user may specify that they wish only to view one entry, which includes only the most recent information, and that they wish to be able to click a link or other control to display the remaining information in reverse chronological order. The query system 132 utilizes this information to generate an output and to cause the output to be presented to the user on the user's computer monitor.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
   storing, on a client machine, a local index of articles associated with a user of the client machine;
   executing a search query on a local search engine running on the client machine and referencing the local index;
   responsive to executing the search query, receiving from the local search engine a result set associated with the search query, the search query referencing at least one of a person and an organization, the result set comprising a plurality of search results, one of the search results comprising search result data describing an attribute of the at least one of a person and an organization;
   identifying a global directory separate from the local index of articles;
   determining a global directory entry associated with the one of the search results received from the local search engine via a query of the identified global directory, the query of the global directory being separate from the search query submitted for execution on the local search engine, the global directory entry comprising a global directory entry attribute associated with the at least one of a person and an organization;
   modifying the search result data based at least in part on the global directory entry attribute; and
   displaying the modified search result data to a user.

2. The method of claim 1, wherein the global directory comprises a Lightweight Directory Access Protocol (LDAP) compliant directory.

3. The method of claim 1, wherein the search query comprises a telephone number.

4. The method of claim 1, wherein the search query comprises a name.

5. The method of claim 1, further comprising:
   receiving a user preference; and
   modifying the result set based at least in part on the user preference.

6. The method of claim 5, wherein modifying the result set comprises filtering the result set.

7. The method of claim 5, wherein modifying the result set comprises reordering the result set.

8. The method of claim 5, further comprising, before causing the search query to be executed, modifying the search query based at least in part on the user preference.

9. The method of claim 1, wherein the search query comprises an implicit query.

10. The method of claim 1, wherein modifying the search result data comprises modifying at least one of a priority, a significance, and a placement of at least one of the search results.

11. The method of claim 1, wherein modifying the search result data comprises adding the global directory entry attribute to at least one of the search results.

12. The method of claim 1, wherein modifying the search result data comprises replacing a portion of at least one of the search results with the global directory entry attribute.

13. A method comprising:
    storing, on a client machine, a local index of articles associated with a user of the client machine;
    executing a search query on a local search engine running on the client machine and referencing the local index;
    responsive to executing the search query, receiving from the local search engine a result set associated with the search query, the search query referencing at least one of a person and an organization, the result set comprising a search result, the search result comprising search result data describing an attribute of the at least one of a person and an organization;
    identifying a global directory separate from the local index of articles;
    determining a global directory entry associated with the at least one of a person and an organization via a query of the identified global directory, the query of the global directory being separate from the search query submitted for execution on the local search engine, the global directory entry comprising a global directory entry attribute associated with the at least one of a person and an organization; and
    modifying the global directory entry attribute based at least in part on the search result data, the modifying comprising:
        requesting a confirmation to modify the global directory entry attribute,
        receiving the confirmation to modify the global directory entry attribute, and
        responsive to receiving the confirmation to modify the global directory entry attribute, modifying and storing the global directory entry attribute.

14. The method of claim 13, wherein the result set comprises documents.

15. The method of claim 14, wherein at least one of the documents is a web page.

16. A method comprising:
    storing, on a client machine, a local index of articles associated with a user of the client machine;
    executing a search query on a local search engine running on the client machine and referencing the local index;
    responsive to executing the search query, receiving from the local search engine a result set associated with the search query, the search query referencing at least one of a person and an organization, the result set comprising a search result, the search result comprising search result data describing an attribute of the at least one of a person and an organization;

identifying a global directory separate from the local index of articles;

determining a global directory entry associated with the at least one of a person and an organization via a query of the global directory, the query of the global directory being separate from the search query submitted for execution on the local search engine;

identifying a discrepancy between the search result data and the global directory entry;

outputting an alert associated with the discrepancy;

modifying the global directory entry based at least in part on the discrepancy; and storing the modified global directory entry.

17. The method of claim 16, wherein the search result comprises a contact.

18. A method executed on a processor of a computer, the method comprising:

storing, on a client machine, a local index of articles associated with a user of the client machine;

executing a search query on a local search engine running on the client machine and referencing the local index;

responsive to executing the search query, receiving from the local search engine a result set associated with the search query, the search query referencing at least one of a person and an organization, the result set comprising search result data describing one or more attributes of the at least one of a person and an organization;

determining, via a query of a global directory, that no entry in the global directory matches the one or more attributes described by the search result data;

creating, in a global directory, a global directory entry comprising a global directory entry attribute, the global directory entry attribute comprising at least one of the one or more attributes described by the search result data of the result set received from the local search engine; and storing the global directory entry.

19. A computer-readable storage medium on which is stored program code, the program code comprising:

program code for storing, on a client machine, a local index of articles associated with a user of the client machine;

program code for executing a search query on a local search engine running on the client machine and referencing the local index;

program code for receiving, from the local search engine responsive to executing the search query, a result set associated with the search query, the search query referencing at least one of a person and an organization, the result set comprising a plurality of search results, one of the search results comprising search result data describing an attribute of the at least one of a person and an organization;

program code for identifying a global directory separate from the local index of articles;

program code for determining a global directory entry associated with the one of the search results received from the local search engine via a query of the identified global directory, the query of the global directory being separate from the search query submitted for execution on the local search engine, the global directory entry comprising a global directory entry attribute associated with the at least one of the person and organization;

program code for modifying the search result data based at least in part on the global directory entry attribute; and program code for displaying the modified search result data to a user.

20. The computer-readable storage medium of claim 19, further comprising:

program code for receiving a user preference; and program code for modifying the result set based at least in part on the user preference.

21. The computer-readable storage medium of claim 20, wherein program code for modifying the result set comprises program code for filtering the result set.

22. The computer-readable storage medium of claim 20, wherein program code for modifying the result set comprises program code for reordering the result set.

23. The computer-readable storage medium of claim 19, further comprising program code for, before causing the search query to be executed, modifying the search query based at least in part on the user preference.

24. The computer-readable storage medium of claim 19, wherein program code for modifying the search result data comprises program code for adding the global directory entry attribute to the at least one of the search results.

25. The computer-readable storage medium of claim 19, wherein program code for modifying the search result data comprises program code for replacing a portion of the at least one of the search results with the global directory entry attribute.

26. A computer-readable storage medium on which is stored program code, the program code comprising:

program code for storing, on a client machine, a local index of articles associated with a user of the client machine;

program code for executing a search query on a local search engine running on the client machine and referencing the local index;

program code for receiving, from the local search engine responsive to executing the search query, a result set associated with the search query, the search query referencing at least one of a person and an organization, the result set comprising a search result, the search result comprising search result data describing an attribute of the at least one of a person and an organization;

program code for identifying a global directory separate from the local index of articles;

program code for determining a global directory entry associated with the at least one of a person and an organization via a query of the identified global directory, the query of the global directory being separate from the search query submitted for execution on the local search engine, the global directory entry comprising a global directory entry attribute associated with the at least one of a person and an organization;

program code for modifying the global directory entry attribute based at least in part on the search result data, the modifying comprising:

program code for requesting a confirmation to modify the global directory entry attribute, program code for receiving the confirmation to modify the global directory entry attribute, and program code for modifying and storing the modified global directory entry attribute, responsive to receiving the confirmation to modify the global directory entry attribute.

27. A computer-readable storage medium on which is stored program code, the program code comprising:

program code for storing, on a client machine, a local index of articles associated with a user of the client machine;

program code for executing a search query on a local search engine running on the client machine and referencing the local index;

program code for receiving, from the local search engine responsive to executing the search query, a result set associated with the search query, the search query referencing at least one of a person and an organization, the result set comprising a search result, the search result comprising search result data describing an attribute of the at least one of a person and an organization;

program code for identifying a global directory separate from the local index of articles;

program code for determining a global directory entry associated with the at least one of a person and an organization via a query of the global directory, the query of the global directory being separate from the search query submitted for execution on the local search engine;

program code for identifying a discrepancy between the search result data and the global directory entry;

program code for outputting an alert associated with the discrepancy;

program code for modifying the global directory entry based at least in part on the discrepancy; and program code for storing the modified global directory entry.

28. A computer-readable storage medium on which is stored program code, the program code comprising:

program code for storing, on a client machine, a local index of articles associated with a user of the client machine;

program code for executing a search query on a local search engine running on the client machine and referencing the local index;

program code for receiving, from the local search engine responsive to executing the search query, a result set associated with the search query, the search query referencing at least one of a person and an organization, the result set comprising search result data describing one or more attributes of the at least one of a person and an organization;

program code for determining, via a query of a global directory, that no entry in the global directory matches the one or more attributes described by the search result data;

program code for creating, in a global directory, a global directory entry comprising a global directory entry attribute, the global directory entry attribute comprising at least one of the one or more attributes described by the search result data of the result set received from the local search engine; and program code for storing the global directory entry.

* * * * *